United States Patent
Soiaporn et al.

(10) Patent No.: US 11,863,502 B2
(45) Date of Patent: *Jan. 2, 2024

(54) SYSTEMS AND METHODS FOR A TWO-TIER MACHINE LEARNING MODEL FOR GENERATING CONVERSATIONAL RESPONSES

(71) Applicant: Capital One Services, LLC, McLean, VA (US)

(72) Inventors: Kunlaya Soiaporn, Vienna, VA (US); Victor Alvarez Miranda, McLean, VA (US); Pamela Katali, Gaithersburg, MD (US); Arturo Hernandez Zeledon, Arlington, VA (US); Rui Zhang, New York, NY (US); Kwan-Yuet Ho, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,917

(22) Filed: Feb. 7, 2023

(65) Prior Publication Data

US 2023/0188483 A1 Jun. 15, 2023

Related U.S. Application Data

(63) Continuation of application No. 17/738,224, filed on May 6, 2022, now Pat. No. 11,616,741, which is a continuation of application No. 16/908,116, filed on Jun. 22, 2020, now Pat. No. 11,356,389.

(51) Int. Cl.
| | | |
|---|---|---|
| H04L 51/02 | (2022.01) | |
| G10L 15/16 | (2006.01) | |
| G06N 20/20 | (2019.01) | |
| G06F 18/23 | (2023.01) | |
| G06V 10/762 | (2022.01) | |
| G06V 10/80 | (2022.01) | |
| G06V 10/82 | (2022.01) | |

(52) U.S. Cl.
CPC .............. *H04L 51/02* (2013.01); *G06F 18/23* (2023.01); *G06N 20/20* (2019.01); *G10L 15/16* (2013.01); *G06V 10/763* (2022.01); *G06V 10/809* (2022.01); *G06V 10/82* (2022.01)

(58) Field of Classification Search
CPC ......... H04L 51/02; G06N 20/20; G06F 18/23; G10L 15/16; G06V 10/763; G06V 10/809; G06V 10/82
See application file for complete search history.

(56) References Cited

U.S. PATENT DOCUMENTS

| | | | |
|---|---|---|---|
| 10,691,987 B2 * | 6/2020 | Kaiba | .................... B41J 3/4073 |
| 11,080,336 B2 * | 8/2021 | Van Dusen | ............ G06Q 50/01 |
| 2019/0103095 A1 * | 4/2019 | Singaraju | ................ G06F 16/35 |
| 2020/0066255 A1 * | 2/2020 | Madan | .................... G06F 40/35 |

(Continued)

*Primary Examiner* — Sargon N Nano
(74) *Attorney, Agent, or Firm* — Perkins Coie LLP

(57) ABSTRACT

Methods and systems are described for generating dynamic conversational responses using two-tier machine learning models. The dynamic conversational responses may be generated in real time and reflect the likely goals and/or intents of a user. The two-tier machine learning model may include a first tier that determines an intent cluster based on a feature input, and a second tier that determines a specific intent from the cluster.

20 Claims, 5 Drawing Sheets

(56) References Cited

U.S. PATENT DOCUMENTS

| | | | |
|---|---|---|---|
| 2020/0074984 A1* | 3/2020 | Ho | G10L 15/1815 |
| 2020/0082214 A1* | 3/2020 | Salammagari | G06F 40/30 |
| 2020/0143247 A1* | 5/2020 | Jonnalagadda | G06N 3/044 |
| 2020/0320978 A1* | 10/2020 | Chatterjee | G10L 15/1822 |
| 2021/0097140 A1* | 4/2021 | Chatterjee | G06N 5/022 |
| 2021/0157990 A1* | 5/2021 | Lima | H04L 51/02 |
| 2022/0208177 A1* | 6/2022 | Chandra | G10L 15/063 |
| 2022/0272040 A1* | 8/2022 | Bastug | H04L 47/82 |

* cited by examiner

SYSTEMS AND METHODS FOR A TWO-TIER MACHINE LEARNING MODEL FOR GENERATING CONVERSATIONAL RESPONSES

CROSS-REFERENCE TO RELATED APPLICATION(S)

This application is a continuation of U.S. patent application Ser. No. 17/738,224, filed May 6, 2022, which is a continuation of U.S. patent application Ser. No. 16/908,116, filed Jun. 22, 2020. The content of the foregoing application is incorporated herein in its entirety by reference.

FIELD OF THE INVENTION

The invention relates to generating dynamic conversational responses using two-tier machine learning models.

BACKGROUND

In recent years, the amount and uses of interactive programs has risen considerably. In tandem with this rise, is the need to have human-like interactions and/or create applications that mimic the tone, cadence, and speech patterns of humans. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic conversational responses. Conversational responses include communications between a user and a system that may maintain a conversational tone, cadence, or speech pattern of a human during an interactive exchange between the user and the system. The interactive exchange may include the system responding to one or more user actions (which may include user inactions) and/or predicting responses prior to receiving a user action. In order to maintain the conversational interaction during the exchange, the system may advantageously generate responses that are both timely and pertinent (e.g., in a dynamic fashion). This requires the system to determine both quickly (i.e., in real-time or near real-time) and accurately the intent, goal, or motivation behind a user input. These user input or actions may take various forms including speech commands, textual inputs, responses to system queries, and/or other user actions (e.g., logging into a mobile application of the system). In each case, the system may aggregate information about the user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein use one or more machine learning models. For example, the methods and system may use a two-tier machine learning model (e.g., a first machine learning model that feeds a second machine learning model, in which each model may be separately generated and/or trained). For example, the methods and systems disclosed herein may use the two-tier machine learning model to both quickly and accurately determine an intent of the user. The use of the two-tier machine learning model improves accuracy and precision, while providing the responses in a timely manner.

For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, feature inputs for similar intents (e.g., a first intent of a user to learn his/her maximum credit limit and a second intent of a user to learn a current amount in his/her bank account) may have similar feature inputs as much of the underlying aggregated information may be the same. Moreover, training data for a machine learning model (e.g., known intents and labeled feature inputs) may be sparse. Accordingly, determining a specific intent of a user, with a high level of precision is difficult, even when using a machine learning model.

To overcome these technical challenges, the methods and systems disclosed herein are powered through a two-tier machine learning model. The first machine learning model (or first tier) is selected based on its attributes to generate results with sparse amounts of training data and/or in a supervised manner. For example, the first tier of the machine learning model may comprise a factorization machine model. Using the sparse amount of data, the first machine learning model can be used to determine an intent cluster for the user. For example, the first machine learning model may group the feature input into one of a plurality of categories of specific intents. The output from the first machine learning model may then be input into a second machine learning model (or second tier). For example, the output may comprise the feature input, a determination of an intent cluster, and/or a specific model (or algorithm) for use in the second tier.

The second machine learning model may then determine a specific intent based on the output from the first machine learning model. Given the two-tiered structure, the second machine learning model may be individually trained and/or trained on training data specific to the second machine learning model. Additionally, the second machine learning model can also use a supervised learning model (e.g., an artificial neural network). For example, as the initial determination of the intent cluster has been made, the second machine learning model can be trained to optimize the precision of the selection of the specific intent. That is, the output of the second machine learning model, and the response generated based on that output, will only be selected from responses from the intent cluster. It should also be noted that in some embodiments, the first machine learning model may be either a supervised or unsupervised machine learning model, and/or the second machine learning model may be a supervised or unsupervised machine learning model.

In some aspects, the methods and systems are disclosed for generating dynamic conversational responses using two-tier machine learning models. For example, the system may receive a first user action during a conversational interaction with a user interface. The system may determine a first feature input based on the first user action in response to receiving the first user action. The system may input the first feature input into a first machine learning model, wherein the first machine learning model is trained to select an intent cluster from a plurality of intent clusters based on the first feature input and the first user action, and wherein each intent cluster of the plurality of intent clusters corresponds to a respective intent of a user following the first user action.

The system may receive a first output from the first machine learning model. The system may input the first output into a second machine learning model, wherein the second machine learning model is trained to select a specific intent from a plurality of specific intents of the selected intent cluster based on the first output, and wherein each specific intent of the plurality of specific intents corresponds to a respective specific intent of the user following the first user action. The system may receive a second output from the second machine learning model. The system may select a dynamic conversational response from a plurality of dynamic conversational responses based on the second output. The system may generate, at the user interface, the dynamic conversational response during the conversational interaction.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
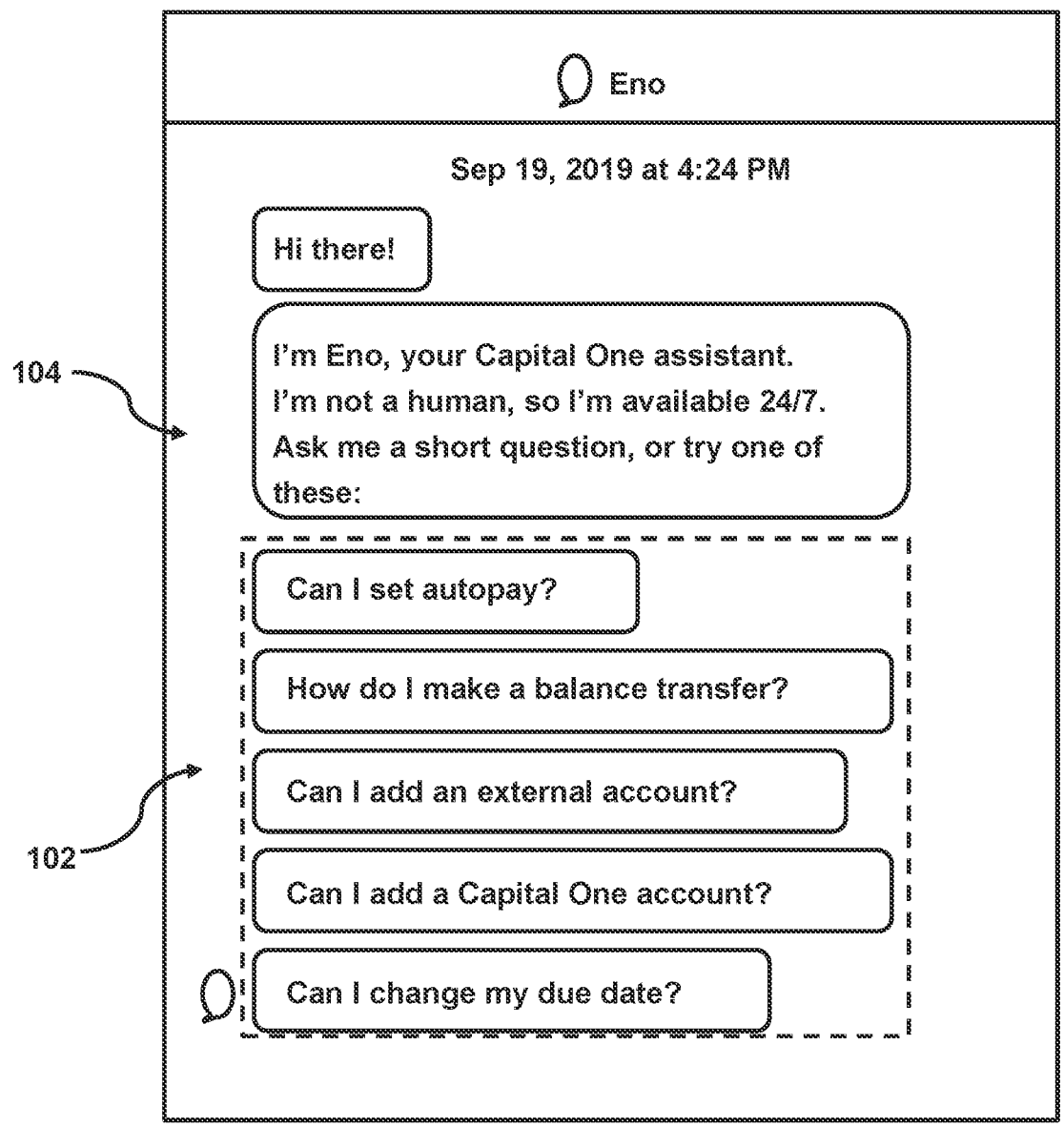
FIG. 1 shows an illustrative user interface for presenting dynamic conversational responses using two-tier machine learning models, in accordance with one or more embodiments.

FIG. 1 shows an illustrative user interface for presenting dynamic conversational responses using two-tier machine learning models, in accordance with one or more embodiments. For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.)

In order to maintain the conversational interaction, the system may need to generate response (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100, inputting a query (e.g., query 104) into user interface 100, and/or a prior action (or lack thereof) by a user to a prior response generated by the system, the system may take one or more steps to generate dynamic conversational responses. These steps may include retrieving data about the user, retrieving data from other sources, monitoring user actions, and/or other steps in order to generate a feature input (e.g., as discussed below).

Figure 2:
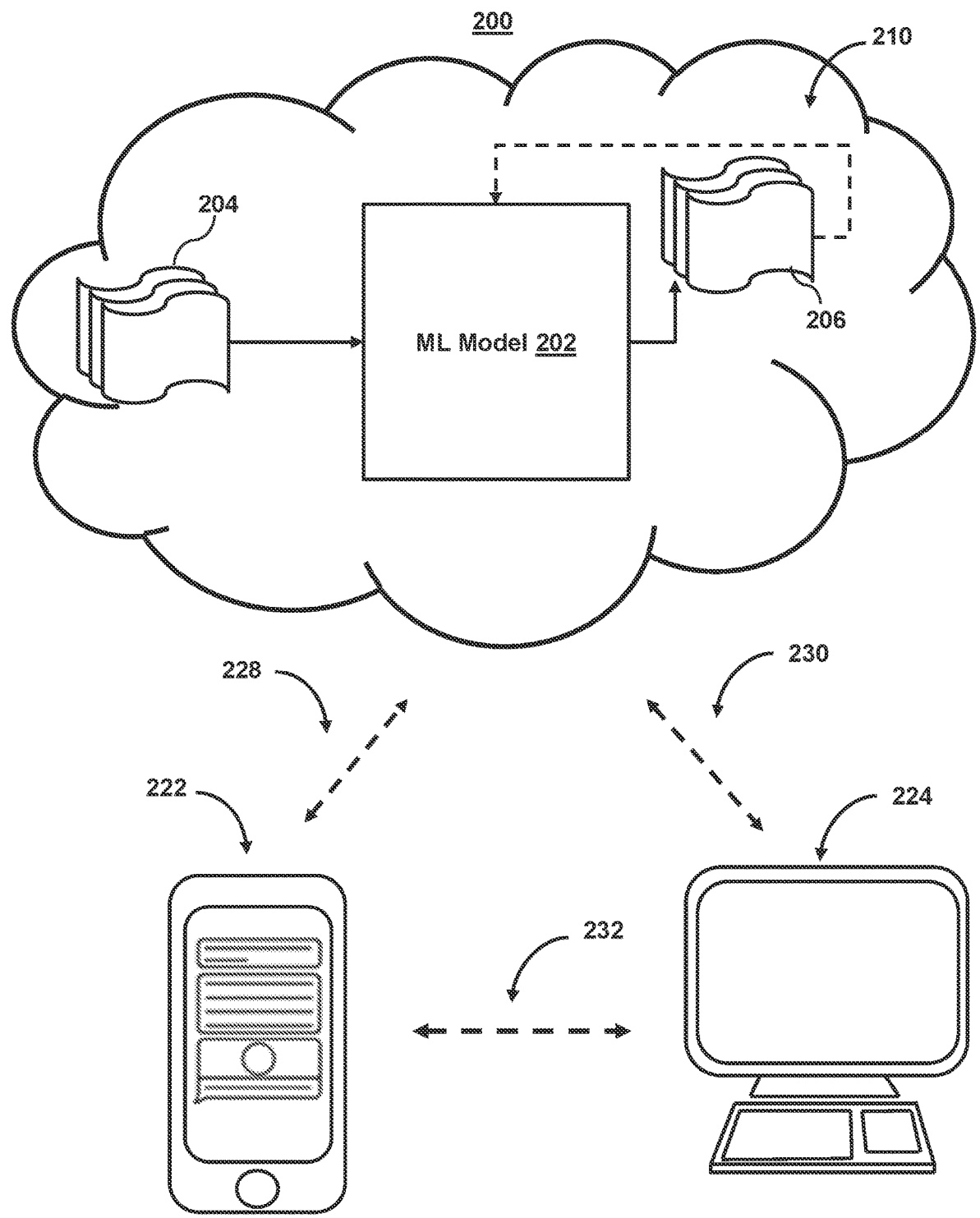
FIG. 2 is an illustrative system for generating dynamic conversational responses using two-tier machine learning models, in accordance with one or more embodiments.

FIG. 2 shows an illustrative system for generating dynamic conversational responses using two-tier machine learning models. For example, system 200 may represent the components used for generating dynamic conversational responses as shown in FIG. 1. As shown in FIG. 2, system 200 may include mobile device 222 and user terminal 224. While shown as a smartphone and personal computer, respectively, in FIG. 2, it should be noted that mobile device 222 and user terminal 224 may be any computing device, including, but not limited to, a laptop computer, a tablet computer, a hand-held computer, other computer equipment (e.g., a server), including "smart," wireless, wearable, and/or mobile devices. FIG. 2 also includes cloud components 210. Cloud components 210 may alternatively be any computing device as described above and may include any type of mobile terminal, fixed terminal, or other device. For example, cloud components 210 may be implemented as a cloud computing system and may feature one or more component devices. It should also be noted that system 200 is not limited to three devices. Users may, for instance, utilize one or more other devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of mobile device 222, those operations may, in some embodiments, be performed by components of cloud components 210. In some embodiments, the various computers and systems described herein may include one or more computing devices that are programmed to perform the described functions. Additionally or alternatively, multiple users may interact with system 200 and/or one or more components of system 200. For example, in one embodiment, a first user and a second user may interact with system 200 using two different components.

With respect to the components of mobile device 222, user terminal 224, and cloud components 210, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 2, both mobile device 222 and user terminal 224 include a display upon which to display data (e.g., based on recommended contact strategies).

Additionally, as mobile device 222 and user terminal 224 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 200 may run an application (or another suitable program). The application may cause the processors and/or control circuitry to perform operations related to generating dynamic conversational responses using two-tier machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications networks or combinations of communications networks. Communication paths 228, 230, and 232 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 210 may be a database configured to store user data for a user. For example, the database may include user data that the system has collected about the user through prior transactions. Alternatively, or additionally, the system may act as a clearing house for multiple sources of information about the user. Cloud components 210 may also include control circuitry configured to perform the various operations needed to generate recommendations. For example, the cloud components 210 may include cloud-based storage circuitry configured to store a first machine learning model and a second machine learning model. Cloud components 210 may also include cloud-based control circuitry configured to determine an intent of the user based on a two-tier machine learning model. Cloud components 210 may also include cloud-based input/output circuitry configured to generate the dynamic conversational response during the conversational interaction.

Cloud components 210 includes machine learning model 202. Machine learning model 202 may take inputs 204 and provide outputs 206. The inputs may include multiple datasets such as a training dataset and a test dataset. Each of the plurality of datasets (e.g., inputs 204) may include data subsets related to user data, contact strategies, and results. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, machine learning model 202 may include an artificial neural network (e.g., as described in FIG. 3 below). In such embodiments, machine learning model 202 may include an input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202 (e.g., whether a first length of time corresponds to lengths of programming time for previously completed stories by contributors without a required skill).

Figure 3:
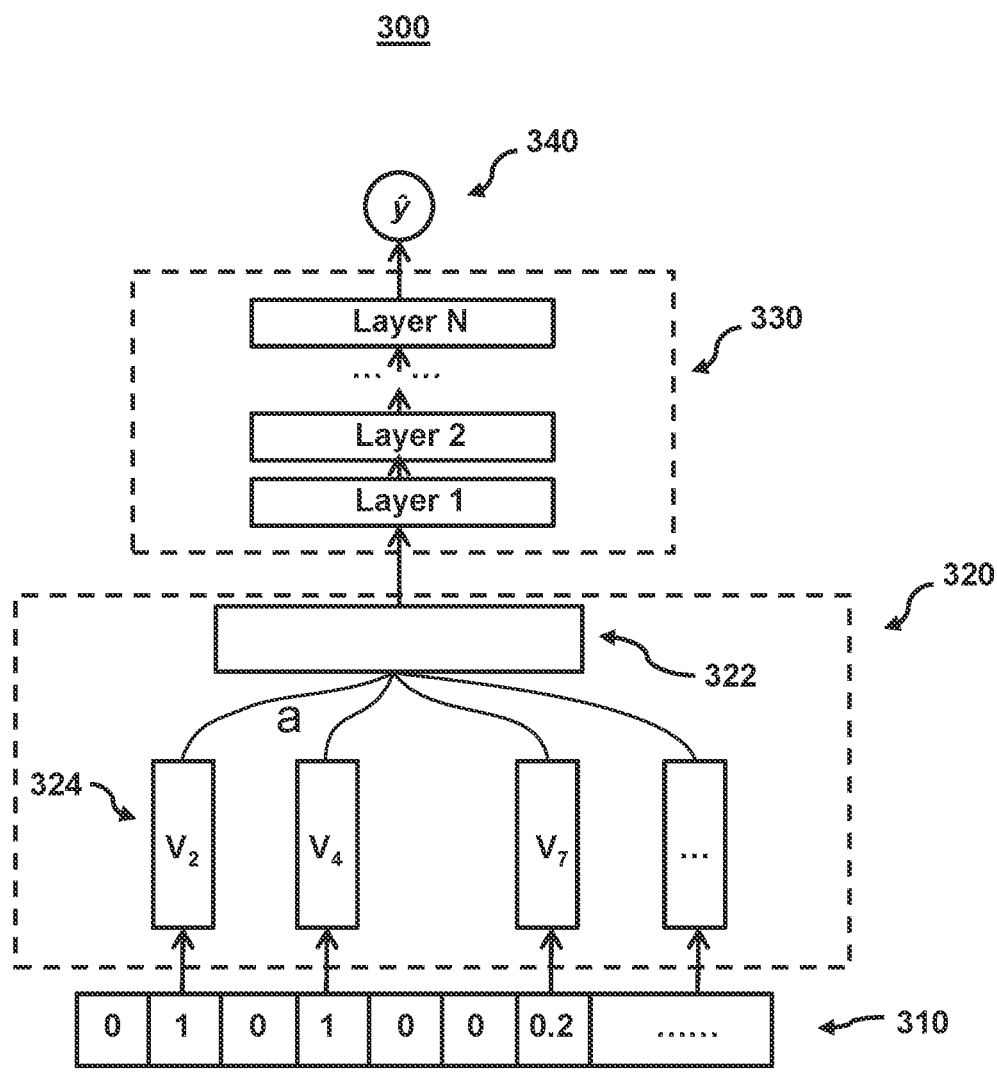
FIG. 3 is an illustrative model architecture a two-tier machine learning model, in accordance with one or more embodiments.

FIG. 3 is an illustrative model architecture of a two-tier machine learning model, in accordance with one or more embodiments. One tier of the multi-tiered machine learning model may include an artificial neural network (e.g., model 330) and another tier may include a factorization machine model (e.g., model 320). In some embodiments, a first machine learning model (e.g., model 320) is a supervised machine learning model and a second machine learning model (e.g., model 330) is an unsupervised machine learning model. It should be noted that alternatively, the first machine learning model (e.g., model 320) may be either a supervised or unsupervised machine learning model and/or the second machine learning model (e.g., model 330) may be a supervised or unsupervised machine learning model.

In some embodiments, model 300 may predict a goal or intent of a user. This goal or intent may be selected from a plurality of goals and/or intents stored by the system. Model 300 may first determine an intent cluster (e.g., a group or category of intents) and then select a specific intent from the intent cluster. In some embodiments, the system may determine the cluster of intents based on the similar feature inputs. For example, the system may cluster goals/intents based on similar characteristics of the users. For example, the system may determine that users who ask different questions about payment have similar account information and digital activities. The system may further determine that the users tend to be different from those of users who have a one-off type request, such as lost card reports or travel notification.

A multi-tiered approach may be used to capture this behavior. The first layer of the model (e.g., model 320) identifies which group of goals is most likely, then in the subsequent layer, the model (e.g., model 330) identifies which specific goals are most likely. The clusters of goals used in the first layer (e.g., model 320) are derived based on feature data and the known goal/intent list, which can change as available data changes or expands. In some embodiments, a specific intent may comprise its own intent cluster and/or not every potential specific intent needs to belong to an intent cluster. For example, if the first-layer model (e.g., model 320) determines that none of the existing clusters are likely, a default classification model may be used to make a prediction at goal level to make sure that goals not belonging to any cluster can be predicted.

In some embodiments, the model (e.g., model 300) may automatically perform actions based on output 340. In some embodiments, the model (e.g., model 300) may not perform any actions on a user's account, rather the output of the model (e.g., model 300) may be only used to decide which dynamic conversational responses display to a user.

Model 320 may be structured as a factorization machine model. Model 320 may be a non-linear model and/or supervised learning model that can perform both classification and regression. Model 320 may perform these tasks by measuring interactions between variables within large datasets. In some embodiments, model 320 may be used to determine intent clusters for a feature input (e.g., feature input 310). For example, model 320 may be a general-purpose supervised learning algorithm that the system uses for both classification and regression tasks. It may be an extension of a linear model that is designed to capture interactions between features within high dimensional sparse datasets economically. For example, factorization machine models are extensions of linear models which model the interactions of variables. They map and plot their interactions to a lower dimension. As a result, the number of parameters extends linearly through the dimensions.

Beneficially, model 320 may estimate parameters under very sparse data and therefore scale to fit large datasets. This is particularly useful for the user account and user action data as this data may be highly correlated and sparse. Moreover, model 320 may not rely on training data, resulting in more compact models. In some embodiments, the features of the training data (e.g., used for model 330), can be derived from model 320. Therefore, model 320 may serve a dual purpose. Additionally, model 320 (as a factorization machine) may work with any real-valued feature vector, whereas other factorization models may require special input data.

In some embodiments, the feature input may include a vector that describes various information about a user, a user action (which may include user inactions), and/or a current or previous interaction with the user. The system may further select the information for inclusion in the feature input based on a predictive value. The information may be collected actively or passively by the system and compiled into a user profile.

In some embodiments, the information (e.g., a user action) may include conversation details such as information about a current session, including a channel or platform, e.g. desktop web, iOS, mobile, a launch page (e.g., the webpage that the application was launched from), a time of launch, activities in a current or previous session before launching the application. The system may store this information and all the data about a conversational interaction may be available in real-time via HTTP messages and/or through data streaming from more or more sources (e.g., via an API).

In some embodiments, the information (e.g., a user action) may include user account information such as types of accounts the user has, other accounts on file such as bank accounts for payment, information associated with accounts such as credit limit, current balance, due date, recent payments, recent transactions. The system may obtain this data in real-time for model prediction through enterprise APIs In some embodiments, the information (e.g., a user action) may include insights about users, provided to the application (e.g., via an API) from one or more sources such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

Model 320 may include embedding layers 324 at which each feature of the vector of feature input 310 is converted into a dense vector representation. These dense vector representations for each feature are then pooled at layer 322 to convert the ser of embedding vectors into a single vector. The created vector is then used as an input for model 330. The output from the first machine learning model may then be input into a second machine learning model (or second tier). For example, the output may comprise the feature input, a determination of an intent cluster, and/or a specific model (or algorithm) for use in the second tier.

Model 330 may be structured as an artificial neural network. Model 330 may include one or more hidden layers. Model 330 may be based on a large collection of neural units (or artificial neurons). Model 330 loosely mimics the manner in which a biological brain works (e.g., via large clusters of biological neurons connected by axons). Each neural unit of a model 330 may be connected with many other neural units of model 330. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 330 may be self-learning and trained, rather than explicitly programmed, and can perform significantly better in certain areas of problem solving, as compared to traditional computer programs.

During training, output 340 may correspond to a classification of model 330 (e.g., a specific intent) and an input known to correspond to that classification may be input into model 330 from model 320. In some embodiments, model 330 may include multiple layers (e.g., where a signal path traverses from front layers to back layers). In some embodiments, back propagation techniques may be utilized by model 330 where forward stimulation is used to reset weights on the "front" neural units. In some embodiments, stimulation and inhibition for model 330 may be more free-flowing, with connections interacting in a more chaotic and complex fashion. During testing, output 340 may indicate whether or not a given input corresponds to a classification of model 330 (e.g., whether or not a given output of model 320 corresponds to a specific intent).

Figure 4:
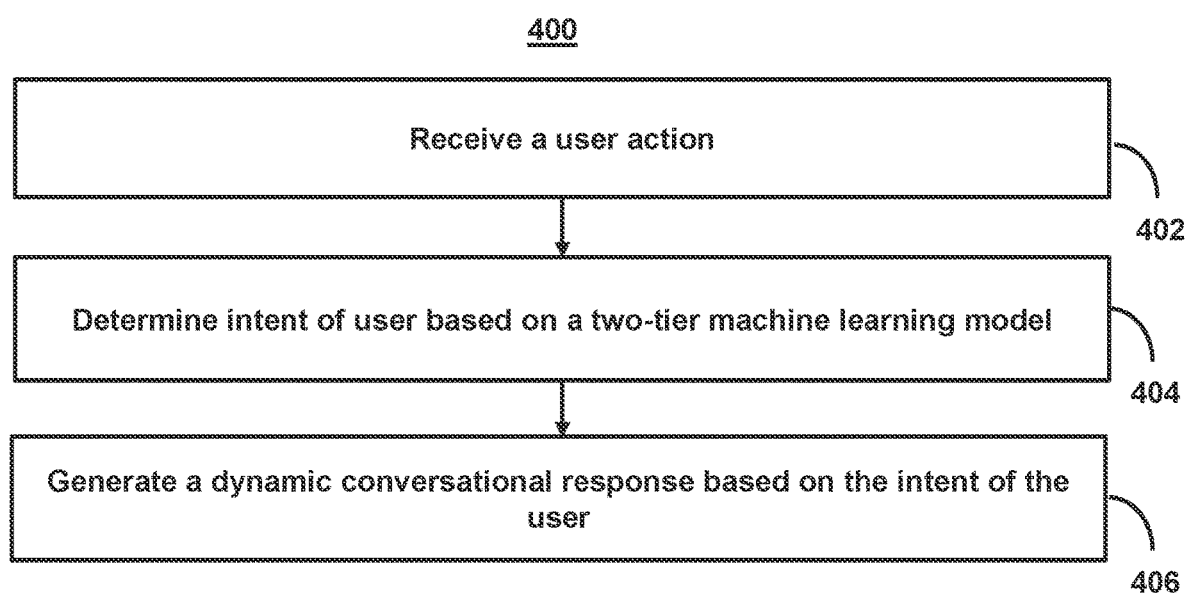
FIG. 4 shows a flowchart of the steps involved in generating dynamic conversational responses using two-tier machine learning models, in accordance with one or more embodiments.

FIG. 4 shows a flowchart of the steps involved in generating dynamic conversational responses using two-tier machine learning models, in accordance with one or more embodiments. For example, process 400 may represent the steps taken by one or more devices as shown in FIGS. 1-2 when generating dynamic conversational responses using two-tier machine learning models (e.g., as shown in FIG. 3).

At step 402, process 400 (e.g., using one or more components in system 200 (FIG. 2)) receives a user action. For example, the system may receive one or more user inputs to a user interface (e.g., user interface 100 (FIG. 1)). The system may then determine a likely intent of the user in order to generate one or more dynamic conversational responses based on that intent. The user action may take various forms include speech commands, textual inputs, responses to system queries, and/or other user actions (e.g., logging into a mobile application of the system). In each case, the system may aggregate information about the user action, information about the user, and/or other circumstances related to the user action (e.g., time of day, previous user actions, current account settings, etc.) in order to determine a likely intent of the user.

At step 404, process 400 (e.g., using one or more components in system 200 (FIG. 2)) determines an intent of a user based on a two-tier machine learning model. For example, the system may first use a first tier of a model (e.g., model 320 (FIG. 3)) to determine an intent cluster of the user's intent. The system may then determine a second tier of a model (e.g., model 330 (FIG. 3)) to determine a specific intent of the user's intent.

For example, the first machine learning model (or first tier) may be selected based on its attributes to generate results with sparse amounts of training data and/or in a supervised manner. For example, the first tier of the machine learning model may comprise a factorization machine model. Using the sparse amount of data, the first machine learning model can be used to determine an intent cluster for the user. For example, the first machine learning model may group the feature input into one of a plurality of categories of specific intents. The second machine learning model may then determine a specific intent based on the output from the first machine learning model. Given the two-tiered structure, the second machine learning model may be individually trained and/or trained on training data specific to the second machine learning model. Additionally, the second machine learning model can use an unsupervised learning model (e.g., an artificial neural network). For example, as the initial determination of the intent cluster has been made, the second machine learning model can be trained to optimize the precision of the selection of the specific intent.

At step 406, process 400 (e.g., using one or more components in system 200 (FIG. 2)) generates a dynamic conversational response based on the intent of the user. For example, by using the two-tier machine learning model, the system may ensure that at least a conversational response is generated based on an intent in the correct cluster. The system may also increase the likelihood that it determines a correct specific intent of the user. For example, as the initial determination of the intent cluster has been made, the second machine learning model can be trained to optimize the precision of the selection of the specific intent. That is, the output of the second machine learning model, and the response generated based on that output, will only be selected from responses from the intent cluster.

For example, the system may generate a dynamic conversational response (e.g., response 102 (FIG. 1)) and present the response in a user interface (e.g., user interface 100 (FIG. 1)). The response may appear with one or more likely responses (e.g., as shown in FIG. 1)). In some embodiments, the system may receive a user action selecting (or not selecting) a response (e.g., response 102 (FIG. 1)) from a user interface.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-2 could be used to perform one or more of the steps in FIG. 4.

Figure 5:
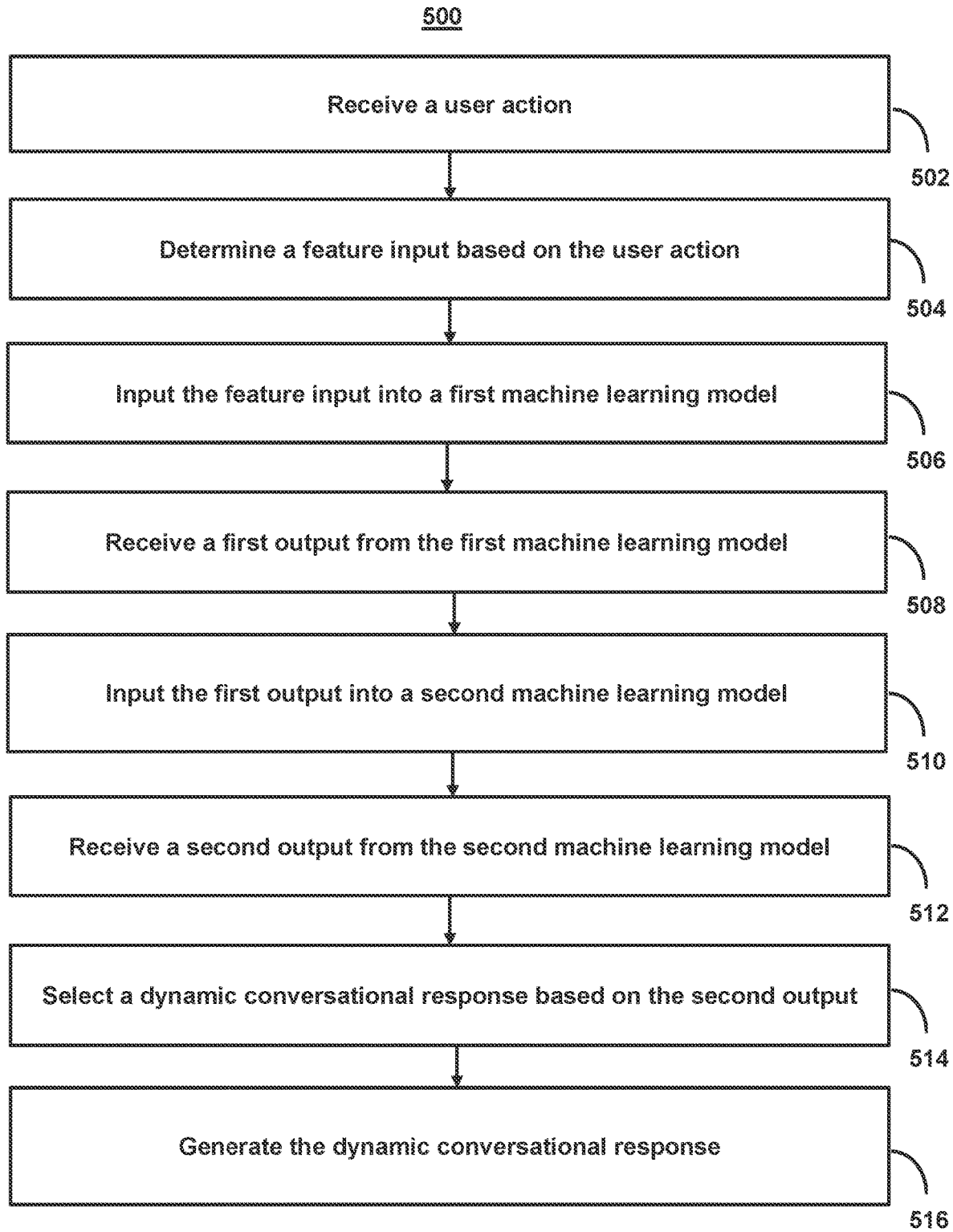
FIG. 5 shows a flowchart of the steps involved in generating dynamic conversational responses using two-tier machine learning models, in accordance with one or more embodiments.

FIG. 5 shows a flowchart of the steps involved in generating dynamic conversational responses using two-tier machine learning models, in accordance with one or more embodiments. For example, process 500 may represent the steps taken by one or more devices as shown in FIGS. 1-3 when in generating dynamic conversational responses.

At step 502, process 500 (e.g., using one or more components in system 200 (FIG. 2)) receives a user action. For example, the system may receive a first user action during a conversational interaction with a user interface as shown in FIG. 1. The conversational interaction may comprise a user inquiry regarding an account of the user and/or may include one or more user actions.

At step 504, process 500 (e.g., using one or more components in system 200 (FIG. 2)) determines a feature input based on the user action. For example, the system may determine, using control circuitry, a first feature input based on the first user action in response to receiving the first user action. The system may generate the feature input based on one or more criteria. For example, the system may generate the feature input based on a conversational detail or information from a user account of the user, a time at which the user interface was launched, and/or a webpage from which the user interface was launched.

At step 506, process 500 (e.g., using one or more components in system 200 (FIG. 2)) inputs the feature input into a first machine learning model. For example, the system may input, using the control circuitry, the first feature input into a first machine learning model, wherein the first machine learning model is trained to select an intent cluster from a plurality of intent clusters based on the first feature input and the first user action, wherein each intent cluster of the plurality of intent clusters corresponds to a respective intent of a user following the first user action.

In some embodiments, the system may receive a first labeled feature input, wherein the first labeled feature input is labeled with a known intent cluster for the first labeled feature input. The system may then train the first machine learning model to classify the first labeled feature input with the known intent cluster.

In some embodiments, the system may cluster available specific intents into one or more plurality of intent clusters. For example, the system may group and/or categorize specific intents into intent clusters based on similarities between the specific intents and/or similarities between the feature inputs. For example, two user actions that may appear similar may first be stored into the same intent cluster and then further classified into specific intents. This ensures that the system determines intents with an increased accuracy.

At step 508, process 500 (e.g., using one or more components in system 200 (FIG. 2)) receives a first output from the first machine learning model. For example, the system may receive, using the control circuitry, a first output from the first machine learning model. In some embodiments, the first machine learning model may be a supervised machine learning model and/or a factorization machine model.

At step 510, process 500 (e.g., using one or more components in system 200 (FIG. 2)) inputs the first output into a second machine learning model. For example, the system may input, using the control circuitry, the first output into a second machine learning model, wherein the second machine learning model is trained to select a specific intent from a plurality of specific intents of the selected intent cluster based on the first output, and wherein each specific intent of the plurality of specific intents corresponds to a respective specific intent of the user following the first user action. In some embodiments, the second machine learning model may be an unsupervised machine learning model and/or an artificial neural network model.

In some embodiments, the system may select the second machine learning model, from a plurality of machine learning models, based on the intent cluster selected from the plurality of intent clusters, wherein each intent cluster of the plurality of intent clusters corresponds to a respective machine learning model from the plurality of machine learning models. For example, the system may develop independent models, using different algorithms and/or trained on different data, in order to increase the precision at which a specific intent is determined.

For example, the system may receive a second user action during the conversational interaction with the user interface. The system may determine a second feature input for the first machine learning model based on the second user action in response to receiving the second user action. The system may input the second feature input into the first machine learning model. The system may receive a different output from the first machine learning model, wherein the different output corresponds to a different intent cluster from the plurality of intent clusters. The system may input the different output into the second machine learning model. At step 512, process 500 (e.g., using one or more components in system 200 (FIG. 2)) receives a second output from the second machine learning model. For example, the system may receive, using the control circuitry, a second output from the second machine learning model. In some embodiments, the system may receive a first labeled output from the first machine learning model, wherein the first labeled output is labeled with a known specific intent. The system may then train the second machine learning model to classify the first labeled output with the known specific intent.

At step 514, process 500 (e.g., using one or more components in system 200 (FIG. 2)) selects a dynamic conversational response based on the second output. For example, the system may select, using the control circuitry, a dynamic conversational response from a plurality of dynamic conversational responses based on the second output. For example, the system may have one or more potential responses and select one or more of these responses based on the predicted specific intent of the user.

At step 516, process 500 (e.g., using one or more components in system 200 (FIG. 2)) generates the dynamic conversational response. For example, the system may generate, at the user interface, the dynamic conversational response during the conversational interaction (e.g., as shown in FIG. 1).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-2 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses using two-tier machine learning models, the method comprising: receiving a first user action during a conversational interaction with a user interface; in response to receiving the first user action, determining a first feature input based on the first user action; inputting the first feature input into a first machine learning model, wherein the first machine learning model is trained to select an intent cluster from a plurality of intent clusters based on the first feature input and the first user action, wherein each intent cluster of the plurality of intent clusters corresponds to a respective intent of a user following the first user action; receiving a first output from the first machine learning model; inputting the first output into a second machine learning model, wherein the second machine learning model is trained to select a specific intent from a plurality of specific intents of the selected intent cluster based on the first output, and wherein each specific intent of the plurality of specific intents corresponds to a respective specific intent of the user following the first user action; receiving a second output from the second machine learning model; selecting a dynamic conversational response from a plurality of dynamic conversational responses based on the second output; and generating, at the user interface, the dynamic conversational response during the conversational interaction.
2. The method of embodiment 2, further comprising selecting the second machine learning model, from a plurality of machine learning models, based on the intent cluster selected from the plurality of intent clusters, wherein each intent cluster of the plurality of intent clusters corresponds to a respective machine learning model from the plurality of machine learning models.
3. The method of any one of embodiments 1-2, further comprising: receiving a second user action during the conversational interaction with the user interface; in response to receiving the second user action, determining a second feature input for the first machine learning model based on the second user action; inputting the second feature input into the first machine learning model; receiving a different output from the first machine learning model, wherein the different output corresponds to a different intent cluster from the plurality of intent clusters; and inputting the different output into the second machine learning model.
4. The method of any one of embodiments 1-3, wherein the first machine learning model is a supervised machine learning model, and wherein the second machine learning model is a supervised machine learning model.
5. The method of any one of embodiments 1-4, wherein the first machine learning model is a factorization machine model, and wherein the second machine learning model is an artificial neural network model.
6. The method of any one of embodiments 1-5, further comprising clustering available specific intents into the plurality of intent clusters.
7. The method of any one of embodiments 1-6, further comprising: receiving a first labeled feature input, wherein the first labeled feature input is labeled with a known intent cluster for the first labeled feature input; and training the first machine learning model to classify the first labeled feature input with the known intent cluster.
8. The method of any one of embodiments 1-7, wherein the first feature input is a conversational detail or information from a user account of the user.
9. The method of any one of embodiments 1-8, wherein the first feature input indicates a time at which the user interface was launched.
10. The method of any one of embodiments 1-9, wherein the first feature input indicates a webpage from which the user interface was launched.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

What is claimed is:

1. A system for generating responses using two-tier machine learning models, the system comprising:
   cloud-based storage circuitry configured to:
      store a first machine learning model, wherein the first machine learning model is trained to select an intent cluster from a plurality of intent clusters based on user actions, and wherein each intent cluster of the plurality of intent clusters corresponds to a respective intent of a user following a first user action; and
      store a second machine learning model, wherein the second machine learning model is trained to select a specific intent from a plurality of specific intents of a selected intent cluster based, and wherein each specific intent of the plurality of specific intents corresponds to a respective specific intent of the user following the first user action;
   cloud-based control circuitry configured to:
      receive the first user action at a user interface;
      select the second machine learning model, from a plurality of machine learning models, based on the intent cluster selected from the plurality of intent clusters, wherein each intent cluster of the plurality of intent clusters corresponds to a respective machine learning model from the plurality of machine learning models;
      select, using the second machine learning model, a response from a plurality of responses; and
   cloud-based input/output circuitry configured to:
      generate the response.

2. A method for generating responses using two-tier machine learning models, the method comprising:
   receiving a first user action;
   determining a first feature input based on the first user action;
   generating, using a first machine learning model, a first output based on the first feature input, wherein the first machine learning model is trained to select an intent cluster from a plurality of intent clusters based on user actions, and wherein each intent cluster of the plurality of intent clusters corresponds to a respective intent of a user following the first user action;
   generating, using a second machine learning model, a second output from the second machine learning model based on the first output, wherein the second machine learning model is trained to select a specific intent from a plurality of specific intents of the selected intent cluster, and wherein each specific intent of the plurality of specific intents corresponds to a respective specific intent of the user following the first user action;

selecting a response from a plurality of responses based on the second output; and generating the response.

3. The method of claim 2, further comprising of selecting the second machine learning model, from a plurality of machine learning models, based on the intent cluster selected from the plurality of intent clusters, wherein each intent cluster of the plurality of intent clusters corresponds to a respective machine learning model from the plurality of machine learning models.

4. The method of claim 2, further comprising: determining the plurality of intent clusters based on similar feature inputs or similar characteristics of other users.

5. The method of claim 2, wherein the first machine learning model is a supervised machine learning model, and wherein the second machine learning model is a supervised machine learning model.

6. The method of claim 2, wherein the first machine learning model is a factorization machine model, and wherein the second machine learning model is an artificial neural network model.

7. The method of claim 2, further comprising of clustering available specific intents into the plurality of intent clusters.

8. The method of claim 2, further comprising:

receiving a first labeled feature input, wherein the first labeled feature input is labeled with a known intent cluster for the first labeled feature input; and training the first machine learning model to classify the first labeled feature input with the known intent cluster.

9. The method of claim 2, wherein the first feature input is further based on a conversion detail or information from a user account of the user.

10. The method of claim 2, wherein the first feature input is further based on a time at which a user interface was launched.

11. The method of claim 2, wherein the first feature input is further based on a webpage from which a user interface was launched.

12. A non-transitory computer-readable medium comprising instructions that, when executed by one or more processors, cause operations comprising:

receiving a first user action;

determining a first feature input based on the first user action;

generating, using a first machine learning model, a first output based on the first feature input, wherein the first machine learning model is trained to select an intent cluster from a plurality of intent clusters based on user actions, and wherein each intent cluster of the plurality of intent clusters corresponds to a respective intent of a user following the first user action;

generating a second output, using a second machine learning model, based on the first output, wherein the second machine learning model is trained to select a specific intent from a plurality of specific intents of the selected intent cluster, and wherein each specific intent of the plurality of specific intents corresponds to a respective specific intent of the user following the first user action;

selecting a response from a plurality of responses based on the second output; and generating the response.

13. The non-transitory computer-readable medium of claim 12, further comprising of instructions that cause further operations comprising of selecting the second machine learning model, from a plurality of machine learning models, based on the intent cluster selected from the plurality of intent clusters, wherein each intent cluster of the plurality of intent clusters corresponds to a respective machine learning model from the plurality of machine learning models.

14. The non-transitory computer-readable medium of claim 12, further comprising instructions that cause further operations comprising determining the plurality of intent clusters based on similar feature inputs or similar characteristics of other users.

15. The non-transitory computer-readable medium of claim 12, wherein the first machine learning model is a supervised machine learning model, and wherein the second machine learning model is a supervised machine learning model.

16. The non-transitory computer-readable medium of claim 12, wherein the first machine learning model is a factorization machine model, and wherein the second machine learning model is an artificial neural network model.

17. The non-transitory computer-readable medium of claim 12, further comprising instructions that cause further operations comprising of clustering available specific intents into the plurality of intent clusters.

18. The non-transitory computer-readable medium of claim 12, further comprising instructions that cause further operations comprising:

receiving a first labeled feature input, wherein the first labeled feature input is labeled with a known intent cluster for the first labeled feature input; and training the first machine learning model to classify the first labeled feature input with the known intent cluster.

19. The non-transitory computer-readable medium of claim 12, wherein the first feature input is further based on a conversion detail or information from a user account of the user.

20. The non-transitory computer-readable medium of claim 12, wherein the first feature input is further based on a time at which a user interface was launched or a webpage from which the user interface was launched.

* * * * *